United States Patent
Hashimoto

[11] Patent Number: 5,820,803
[45] Date of Patent: Oct. 13, 1998

[54] VALVE GATE-TYPE INJECTION MOLDING METHOD AND APPARATUS THEREFOR

[75] Inventor: Noritsugu Hashimoto, Takaoka, Japan

[73] Assignee: Takaoka Seiko Co., Ltd., Takaoka, Japan

[21] Appl. No.: 860,485

[22] PCT Filed: Oct. 31, 1995

[86] PCT No.: PCT/JP95/02225

§ 371 Date: Jun. 27, 1997

§ 102(e) Date: Jun. 27, 1997

[87] PCT Pub. No.: WO97/16296

PCT Pub. Date: May 9, 1997

[51] Int. Cl.$^6$ .................................................. B29C 45/26
[52] U.S. Cl. ................ 264/154; 264/328.9; 264/328.11; 425/566; 425/577
[58] Field of Search .................... 425/564, 566, 425/DIG. 224, 571, 577; 264/161, 328.9, 328.11, 154, 155

[56] References Cited

U.S. PATENT DOCUMENTS

| | | |
|---|---|---|
| 4,125,352 | 11/1978 | Gellert . |
| 4,521,179 | 6/1985 | Gellert . |
| 4,530,654 | 7/1985 | Rose . |
| 5,423,672 | 6/1995 | Gordon ................................ 425/566 |
| 5,460,763 | 10/1995 | Asai .................................... 264/328.9 |

FOREIGN PATENT DOCUMENTS

| | | |
|---|---|---|
| 53-134860 | 11/1978 | Japan . |
| 55-61438 | 5/1980 | Japan ................................ 425/566 |
| 59-188417 | 10/1984 | Japan . |
| 60-257214 | 12/1985 | Japan . |
| 61-85415 | 6/1986 | Japan . |

*Primary Examiner*—Jill L. Heitbrink
*Attorney, Agent, or Firm*—Varndell Legal Group

[57] ABSTRACT

A valve pin (24b) of a valve for injecting molten resin is inserted into a cavity (31) formed in a mold (22), then the molten resin is injected and filled by way of a gate (30) into a space formed between the valve pin (24b) and the cavity (31). Then the molten resin is cooled and solidified so as to provide a molded product of synthetic resin.

2 Claims, 23 Drawing Sheets

VALVE GATE-TYPE INJECTION MOLDING METHOD AND APPARATUS THEREFOR

TECHNICAL FIELD

The present invention relates to an improvement of a valve gate-type injection molding method and apparatus, wherein molten synthetic resin such as plastic is injected into a closed mold and then the mold is opened to take out a cooled and solidified product, thereby to attain a molded product which is the target product.

BACKGROUND ART

Before now, various types of injection molding methods and apparatuses have been proposed as injection molding methods and apparatuses to attain comparatively precise molded products from synthetic resin, such as plastic.

In particular, in recent years, an injection molding method and apparatus of valve gate type, has been proposed as one of the injection molding methods and apparatuses, in order to reduce the molding cycle time for a molded product.

This valve gate-type injection molding method and apparatus comprises a valve for temporarily holding molten resin to which prepressure is applied, and a valve pin extendably and retractably placed within the valve, wherein by releasing a gate formed in the mold by the valve pin, molten resin, to which prepressure was applied, fills the cavity in the mold at a high speed, and the gate is closed again by the valve pin after the filling of the molten resin.

This type of valve gate-type injection molding method and apparatus has the effect of eliminating the time wasted by the compression of the molten resin before its injection, and therefore shortening the molding cycle time for a molded product, because molten resin within the valve is compressed in advance during the opening of the mold to take out the molded product.

FIG. 18 is a cross section of the principal elements of a conventional valve gate-type injection molding apparatus 1, discussed above, and more particularly the valve gate-type injection molding apparatus 1 to mold a tubular molded product, such as a roller having an axial hole through its center.

The valve gate-type injection molding apparatus 1 comprises an upper mold 2 where a valve body, not shown, is installed, and a lower mold 4 where a tubular cavity 3 is formed. Therein, a first hole 5, having a sectional form of a cone, is formed inside the upper mold 2 at a position corresponding to the upper end 3a of the cavity 3, the inner surface of its lower end is a gate 6 for filling the cavity 3 with molten resin. Also, inside the upper mold 2, a second hole 7, having a sectional form of a cone and a diameter greater than that of the first hole 5, is formed and connects to the upper edge of the first hole 5. In the center thereof, a valve pin 8, of a valve which is not shown, is provided extendably and retractably in a vertical direction opposite to the gate 6.

The end of the valve pin 8 is in the form of a cylinder; its diameter L is substantially equal to that of the diameter M of the gate 6. The valve pin 8 is constituted in such a manner that the gate 6 is closed when the valve pin 8 drops to the position of the gate 6, and the gate 6 is opened when the valve pin 8 rises to the position shown in the drawing.

Meanwhile, a cylindrical core 9 for forming the central hole of a tubular molded product which is molded of molten resin that fills the cavity, is located at the center of the cavity 3 formed inside the lower mold 4. A protruding pin 10, to remove the molded product from the cavity 3, is inserted around the core 9. The protruding pin 10 is arranged to rise and fall with respect to the core 9.

Next, the operation of the valve gate-type injection molding apparatus 1 is explained. As shown in FIG. 19, in which the same portions as in FIG. 18 are shown with the same reference numerals or symbols, the gate 6 enters a state of release according to the position of the valve pin, which has retracted upwards. Therefore the molten resin, compressed in the valve, not shown, is injected by way of gate 6 and fills the cavity 3 as shown with the arrow A.

In this way, molten resin is injected by way of the gate 6 into the cavity 3. When the filling is complete, valve pin 8 drops and stops at the position of the gate 6, as shown with the arrow C in FIG. 20, thereby closing the gate 6 and interrupting the injection of molten resin B to the cavity 3 (this is called gate cut).

Afterwards, molten resin B is cooled using a means for cooling, not shown, and thereby the molten resin B, which filled the cavity 3, is solidified.

After the solidifying of the molten resin B, which filled the cavity 3, the upper mold 2 and lower mold 4 are separated and the mold is opened. As shown in FIG. 21, the molten resin B is solidified inside the cavity 3 of the lower mold 4, leaving a tubular molded product 11 corresponding to the form of the cavity 3.

Meanwhile, when the protruding pin 10 is raised from the position of the protruding pin 10 shown in FIG. 21, the protruding pin 10 rises along the core 9. At the same time, the lower surface of the tubular molded product 11 is supported by the protruding pin 10, while the product 11 is removed from the cavity 3 of the lower mold 4, as shown in FIG. 22.

With this type of conventional valve gate-type injection molding apparatus 1, a roller-shaped molded product 11, having an axial hole 11a formed in the center, is formed as shown in the detail in FIG. 23.

Moreover, machine finishing is performed after molding in the case of forming an under cut C on the upper edge of the axial hole 11a of the molded product 11 as shown in FIG. 24.

However, with the valve gate-type injection molding method and apparatus 1, a cylindrical core 9, to form the axial hole 11a, must be installed in the lower mold 4 in the case of molding a molded product 11 having an axial hole 11a formed in the center. Therefore, this becomes a factor in the high number of mold parts, the complexity of the structure, and increased manufacturing costs for the entire valve gate-type injection molding apparatus.

Also, with the valve gate-type injection molding method and apparatus 1, discussed above, this is a method in which molten resin, under prepressure only in the valve which is not shown, is injected and fills a cavity 3, as shown in FIG. 19. Therefore, the pressure applied to the molten resin, which filled the cavity 3, may be insufficient. In the molded product 11 that is molded with the conventional valve gate-type injection molding method and apparatus 1, a deformed portion D, called a "shrink," distorting the thickness of the axial hole 11a and the surface of the molded product 11, occurs due to a mold shrinkage action as shown in FIG. 25 and causes faulty dimensions of the molded product.

Moreover, the dimensions of a molded product, in which a "shrink" has occurred, must be adjusted with post-processing. This causes a disadvantage of being the very high manufacturing costs for molded products.

Consequently, with the foregoing in view, it is an object of the present invention to provide a valve gate-type injection molding method and apparatus, which reduce the number of parts for the apparatus as a whole.

Also, it is an object of the present invention to provide a valve gate-type injection molding method and apparatus, which do not cause portions with faulty dimensions, such as a "shrink," in the molded product, while reducing the number of parts for the apparatus as a whole.

DISCLOSURE OF THE INVENTION

The present invention is that which is constituted to attain a molded product in such a way that a valve pin of a valve, to inject molten resin, is inserted into a cavity formed in a mold, then molten resin is injected by way of a gate and fills the space formed between the cavity and the valve pin.

With this type of valve gate-type injection molding method and apparatus, a hole in a molded product, molded with molten resin filling a space formed between a valve pin and cavity, is formed with the valve pin inserted in the cavity. Therefore, a core, being one part of a mold, does not need to be installed inside the cavity in the mold in order to form a hole in the center of a molded product as before. This makes possible a reduction in the number of parts of the valve gate-type injection molding apparatus.

Also, with the present invention, a valve pin of a valve is constituted of a large diameter portion, to open and close the gate of the mold, and a small diameter portion, to be inserted inside the cavity formed by the mold. The small diameter portion of the valve pin is inserted inside the cavity, formed by the mold, and then molten resin is injected by way of the gate and fills in the space formed between the small diameter portion of the valve pin and the cavity. Meanwhile, after the gate is cut off by the large diameter portion of the valve pin, the large diameter portion is advanced further and applies pressure to the molten resin injected between the small diameter portion of the valve pin and the cavity, to attain a molded product.

With this type of valve gate-type injection molding method and apparatus, a hole is formed in a molded product, molded of molten resin injected into a space formed between the small diameter portion of the valve pin and the cavity, with the small diameter portion of the valve pin inserted into the cavity. Therefore, the installation of a core, being one part of the mold, inside the cavity of the mold, in order to form a hole in a molded product as before, becomes unnecessary. This makes possible the reduction in the number of parts of the valve gate-type injection molding apparatus. Meanwhile, after the large diameter portion of the valve pin cuts off the gate, the large diameter portion is advanced further toward the cavity and applies pressure to the molten resin inside the cavity. This makes it possible to prevent, as much as possible, the occurrence of portions with faulty dimensions, such as a "shrink", in the thick portions of the molded product.

BEST MODE FOR CARRYING OUT THE INVENTION

An embodiment of the valve gate-type injection molding method and apparatus in accordance with the present invention is discussed in detail below.

Figure 1:
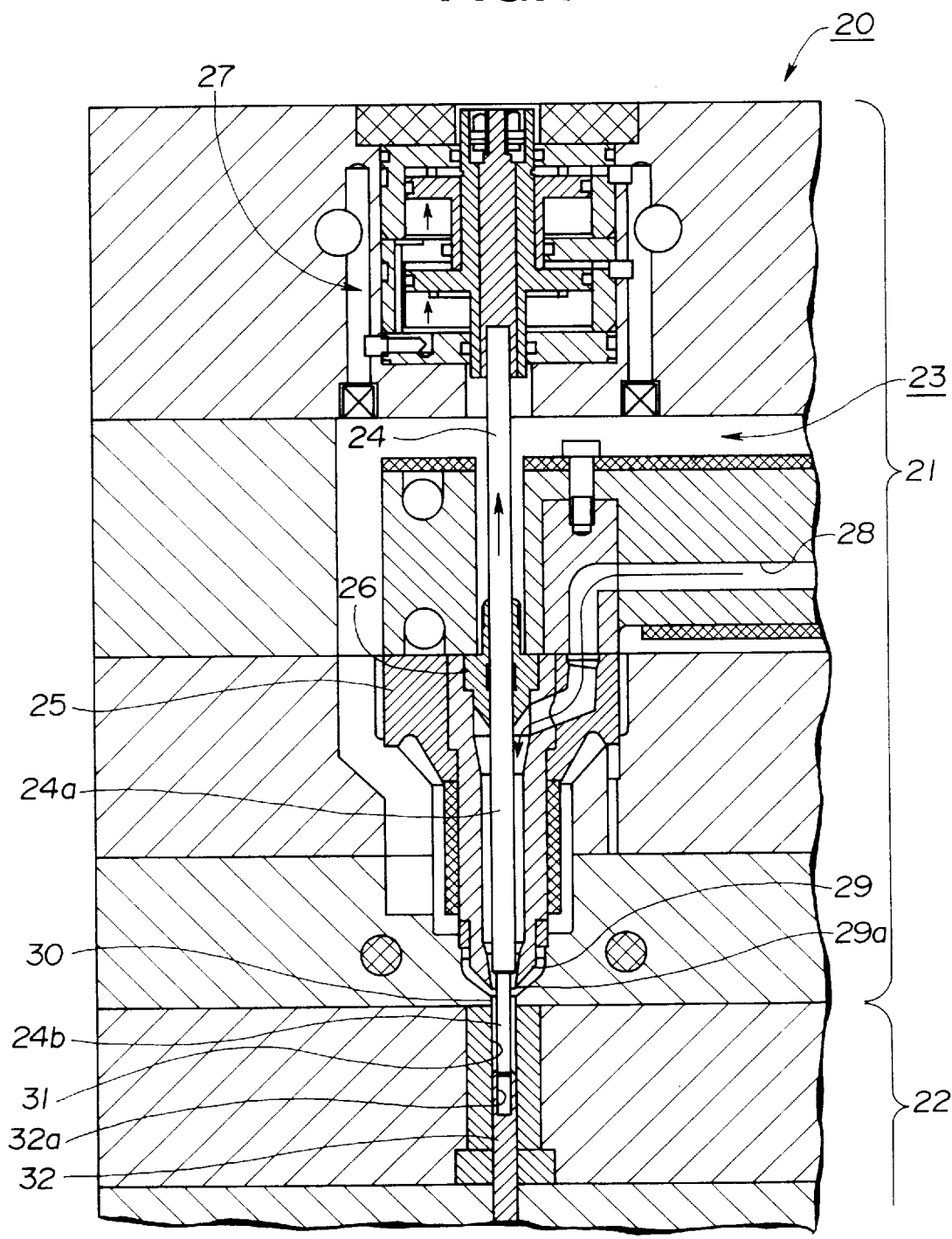
FIG. 1 is a general cross section of a valve gate-type injection molding apparatus, to execute the valve gate-type injection molding operation in accordance with the present invention.

FIG. 1 is a general cross section of the valve gate-type injection molding apparatus 20, to execute the valve gate-type injection molding operation in accordance with the present invention.

The valve gate-type injection molding apparatus 20 henceforth referred to simply as "the apparatus" is constituted of an upper mold 21 and a lower mold 22. A valve 23, to inject molten resin, is installed in the upper mold 21.

The valve 23 is constituted of a valve pin 24, to open and close a gate, discussed below; a body 25, to hold movably upwards and downwards the valve pin 24; and an air piston 27, to move the valve pin 24 a prescribed distance upwards and downwards along a guide bush 26, provided inside the body 25.

A manifold 28, to guide molten resin, under prepressure and which is heated and melted, is formed inside the body 25; its front end reaches as far as a nozzle portion 29, formed on the head of the body 25.

The valve pin 24 is constituted of a large diameter portion 24a, which opens and closes a nozzle hole 29a, formed on the nozzle portion 29 and opens and closes a gate 30, formed below that; and a small diameter portion 24b formed to protrude from the lower end of the valve pin 24.

Meanwhile, a cylindrical cavity 31 is formed inside the lower mold 22; the small diameter portion 24b of the valve pin 24 is inserted in the central portion thereof. Also, the lower end of the small diameter portion 24b is further inserted inside a guide hole 32a, formed in the central portion of a protruding pin 32.

Figure 2:
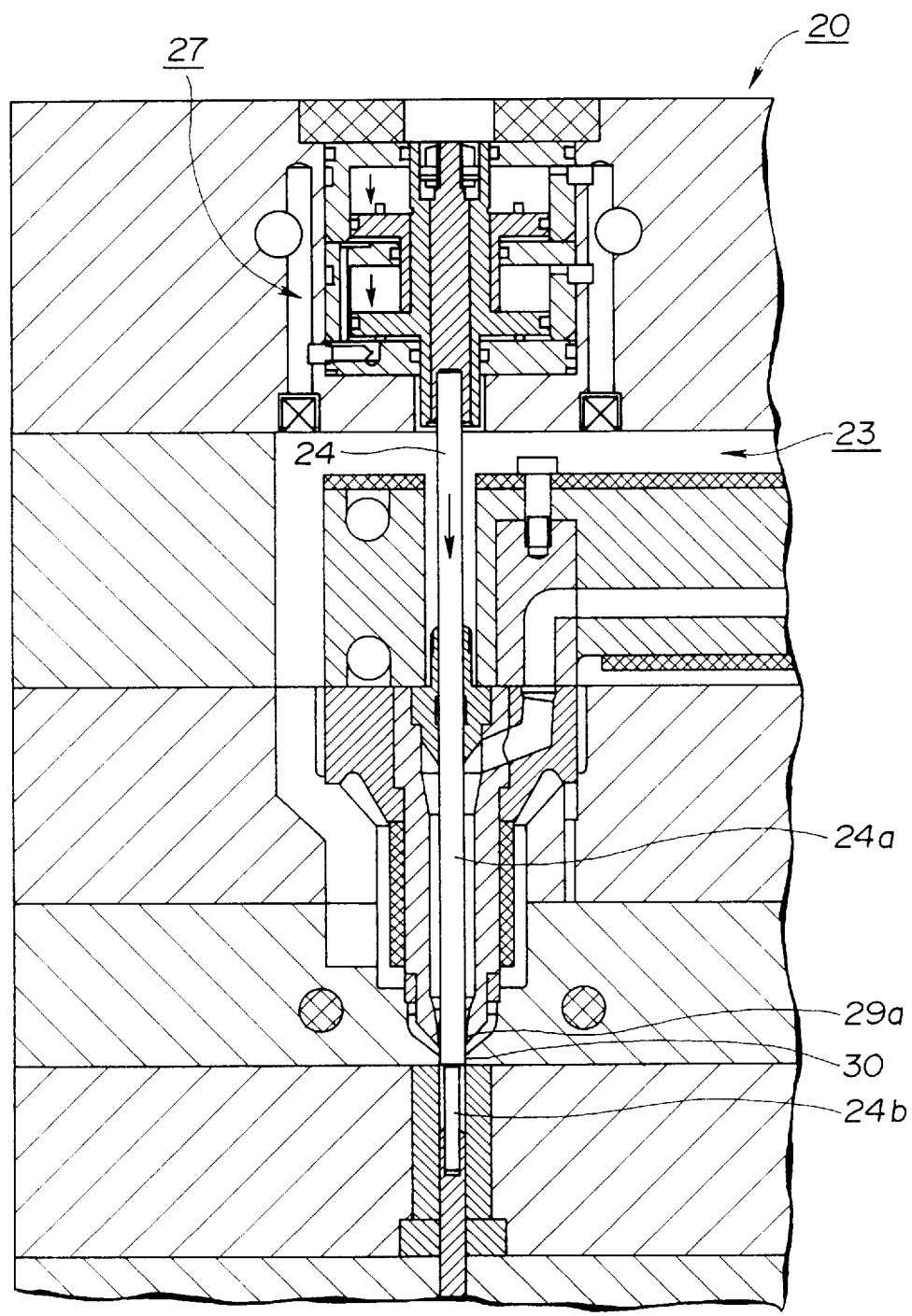
FIG. 2 is a general cross section of a valve gate injection molding apparatus showing the state where the valve pin is moved downwards.

Because of this structure of the valve 23, when the air piston 27 operates, the valve pin 24 moves to an injection position at which molten resin is injected in the cavity 31, as the valve pin 24 is moved upwards as shown in FIG. 1 and opens the nozzle hole 29a and gate 30 with its small diameter portion 24b, and the valve pin 24 also moves to a gate cut position at which injection of molten resin into the cavity 31 is cut off, as the valve pin 24 is moved downward and closes both the gate 30 and the nozzle hole 29a with its large diameter portion 24a, as shown in FIG. 2, in which the same elements are shown with the same reference numerals or symbols as in FIG. 1.

Next, the valve gate-type injection molding method of the present invention, with the valve gate-type injection molding apparatus 20 is explained. Concurrently, the structure of the valve gate-type injection molding apparatus 20 in accordance with the present invention, is explained in greater detail.

Figure 3:
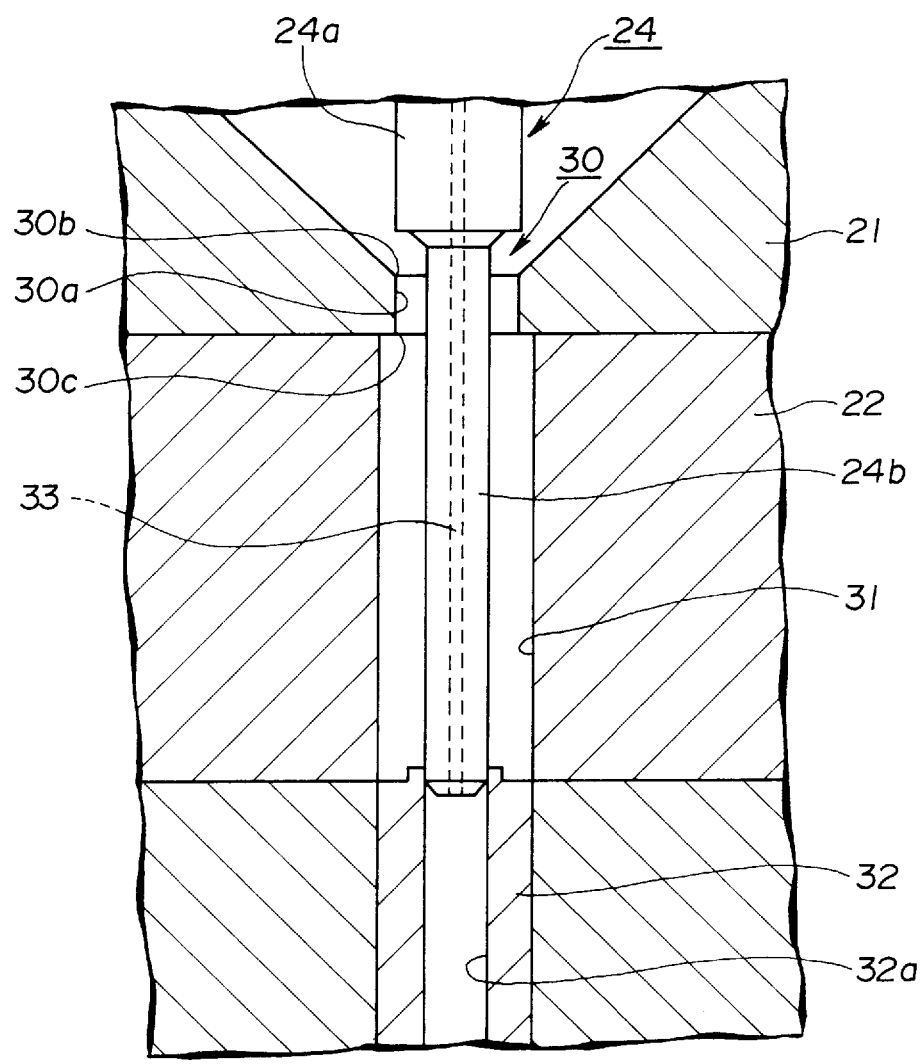
FIG. 3 is a cross section showing an enlargement of principal portions of FIG. 1.

FIG. 3 is a cross section showing an enlargement of principal portions of the valve gate-type injection molding apparatus 20, shown in FIG. 1. More particularly, FIG. 3 shows in detail the gate 30, formed by the upper mold 21 and the cylindrical cavity 31, which is formed by the lower mold 22. FIG. 3 also shows in detail part of the valve pin 24 which is inserted in both the gate 30 and the cavity 31. The nozzle portion 29, shown in FIG. 1, is omitted in this drawing.

The position of the valve pin 24 shown in FIG. 3 corresponds to the position of the valve pin 24 shown in FIG. 1. The small diameter portion 24b passes through the center of the gate 30 and is inserted in the central portion of the cavity 31. Furthermore, its lower end is inserted in the guide hole 32a, which is formed in the center of the protruding pin 32 for removal of the molded product. In FIG. 3, the reference numeral 33 shows a cooling path for guiding a cooling medium, which is formed in the center of the valve pin 24 along the axis. For example, a cooling medium such as nitrogen gas is supplied and guided inside the cooling path 33.

At the stopping position of the valve pin 24, since the small diameter portion 24b of the valve pin 24 is in the center of the gate 30 that has a diameter greater than that of the small diameter portion 24b, the gate 30 is open. Specifically, a ring shaped gap is formed between the inner surface of the gate 30 and the outer surface of the small diameter portion 24b of the valve pin so that it is possible to inject molten resin into the cavity 31 through the ring shaped gap.

The gate 30 is formed by a cylindrical hole 30a, having the same diameter. The gate 30 becomes closed when the large diameter portion 24a of the valve pin 24 is inserted in its upper edge 30b. That closed state is sustained until the large diameter portion 24a reaches the lower edge 30c of the cylindrical hole 30a.

At the stopping position of the valve pin 24 shown in FIG. 3 discussed above, molten resin, which has been heated and melted, is guided by the manifold 28, shown in FIG. 1, to the valve hole 29a. Then that molten resin passes through the valve hole 29a; after that, the molten resin is injected into the cavity 31, by way of the gap between the gate 30 and the small diameter portion 24b of the valve pin 24, and fills in the cavity 31, as shown by the arrow E in FIG. 4.

Figure 4:
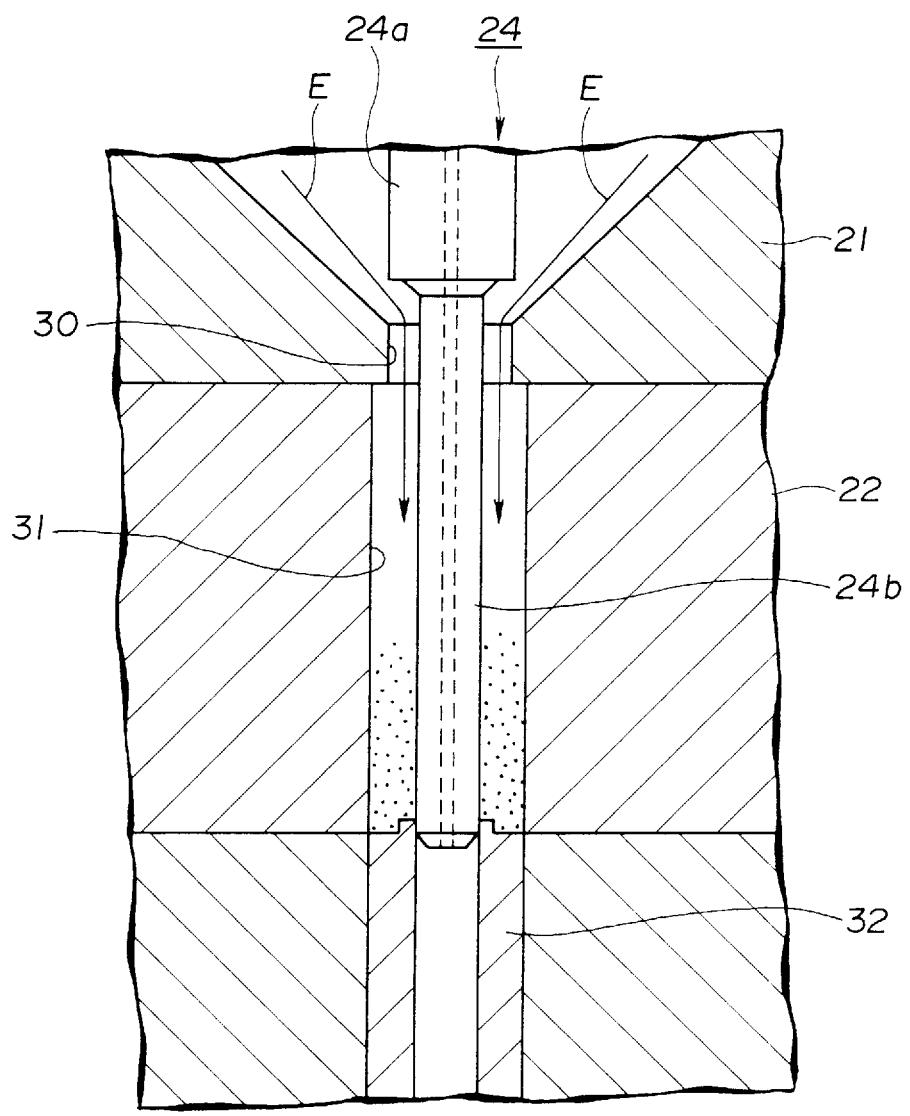
FIG. 4 is a general cross section to show the operation of the valve gate injection molding apparatus in accordance with the present invention.

In this way, when the molten resin fills in the cavity 31, the piston 27, shown in FIG. 1, operates and moves the valve pin 24 downward. Then the large diameter portion 24a of the valve pin 24 is inserted in the upper edge 30b of the gate 30 and interrupts the injection of molten resin to the cavity 31 (gate cut) as shown in FIG. 5, where the same elements as in FIG. 4 are shown with the same reference numerals or symbols.

Figure 5:
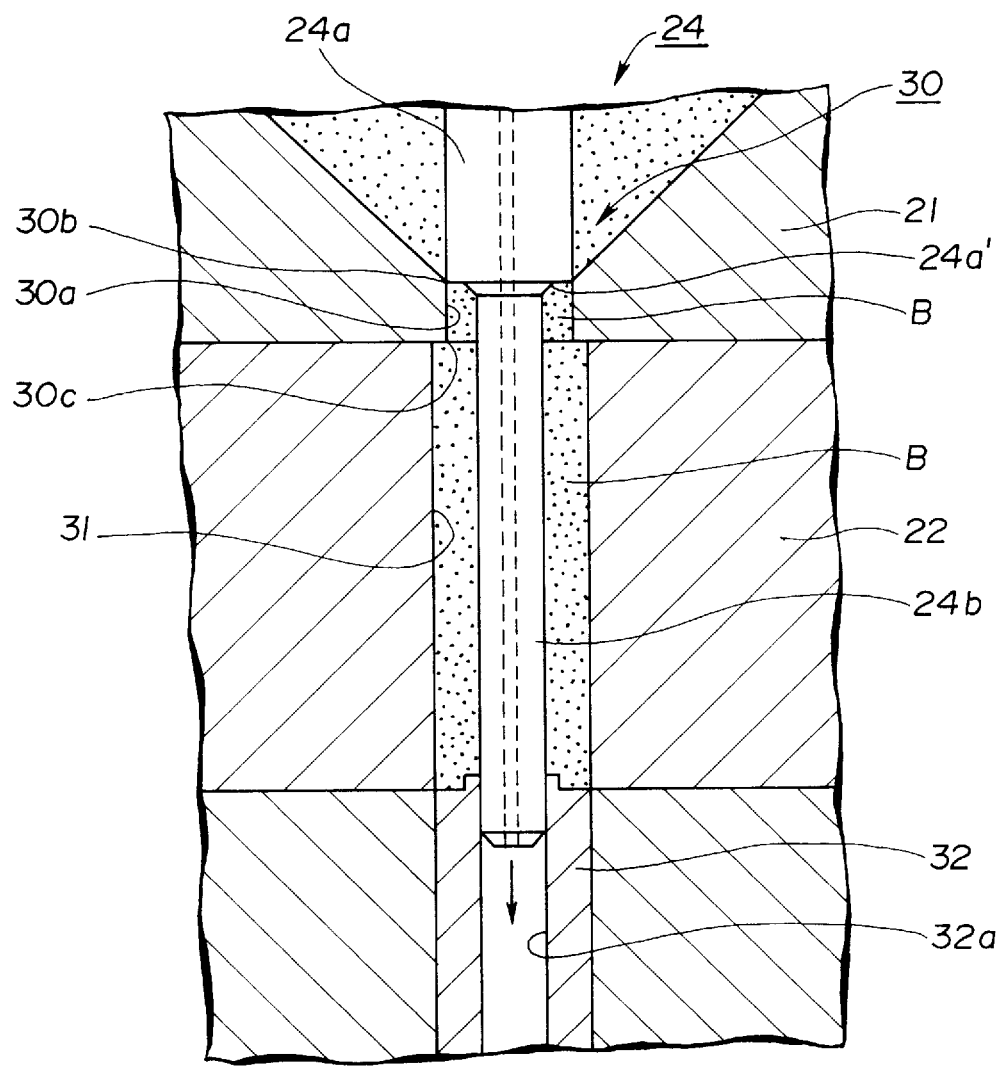
FIG. 5 is a general cross section to show the operation of the valve gate injection molding apparatus in accordance with the present invention.

According to the position of the valve pin 24 shown in FIG. 5, the upper edge 30b of the gate 30 is closed gate cut by the large diameter portion 24a. Therefore, the molten resin then does not flow into the cavity 31. The molten resin B, which was injected, fills inside the cavity 31 and part of the gate 30, formed by the cylindrical hole 30a having the same diameter (specifically, inside the hollow portion formed between the inner surface of the hole 30a and the outer surface of the small diameter portion 24b).

The piston 27 shown in FIG. 1 moves the valve pin 24 further downward from the position of the valve pin 24 shown in FIG. 5. When the lower end 24a' of the large diameter portion reaches the lower edge 30c of the gate 30 as shown in FIG. 6, where the same elements as in FIG. 5 are shown with the same reference numerals or symbols, the molten resin B filling the portion constituting the gate 30, specifically, the molten resin B filling the hollow portion formed between the inner surface of the hole 30a and the outer surface of the small diameter portion 24b shown in FIG. 4, fills the cavity 31 once more, thereby applying more pressure to the molten resin B, already filling the cavity 31.

Afterwards, a cooling medium such as nitrogen gas is supplied by way of the cooling path 33 for guiding a cooling medium, formed along the central axis of the valve pin 24, and cools and solidifies the molten resin B, filling the cavity 31.

Figure 6:
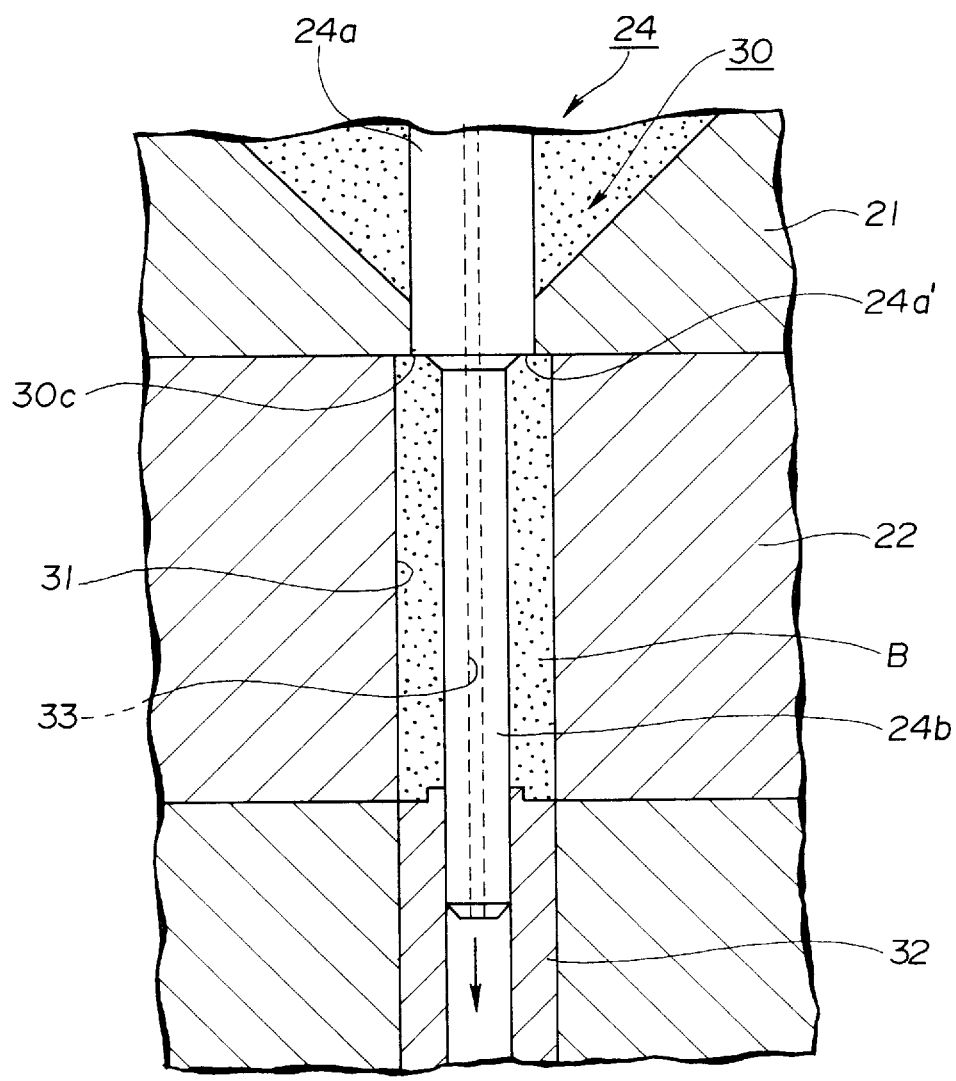
FIG. 6 is a general cross section to show the operation of the valve gate injection molding apparatus in accordance with the present invention.
Figure 7:
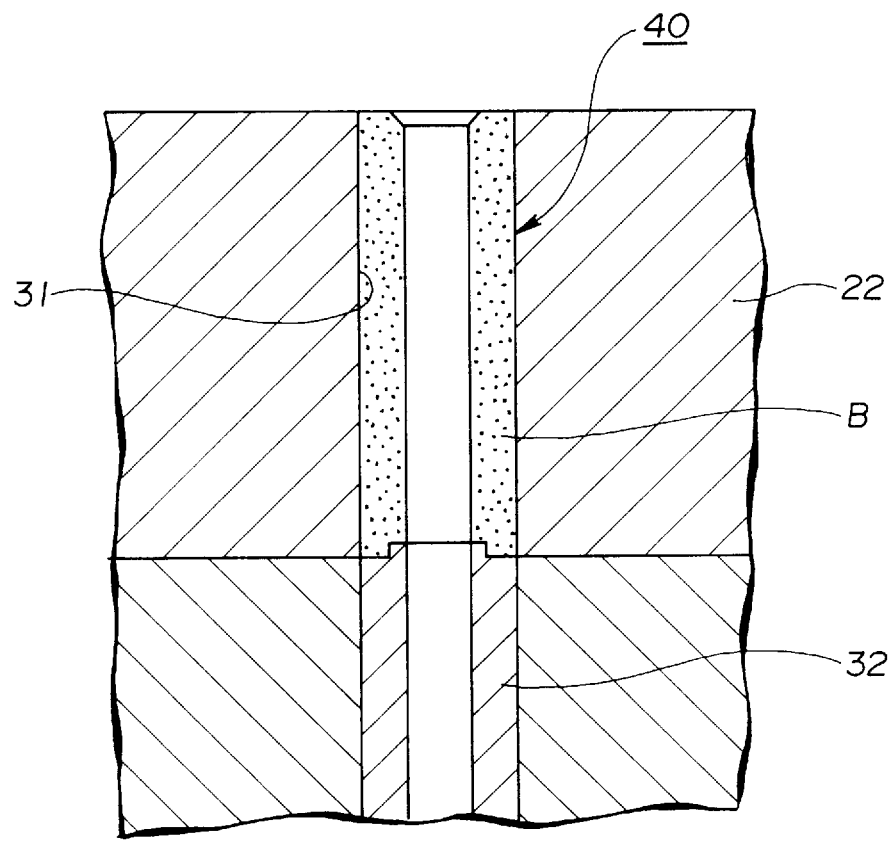
FIG. 7 is a general cross section to show the operation of the valve gate injection molding apparatus in accordance with the present invention.

Next, when the upper mold 21 and lower mold 22 shown in FIG. 6 are vertically separated and the mold is opened, a tubular molded product 40, comprising solidified molten resin B and corresponding to the form of the cavity 31, remains inside the cavity 31 of the lower mold 22 as shown in FIG. 7.

Figure 8:
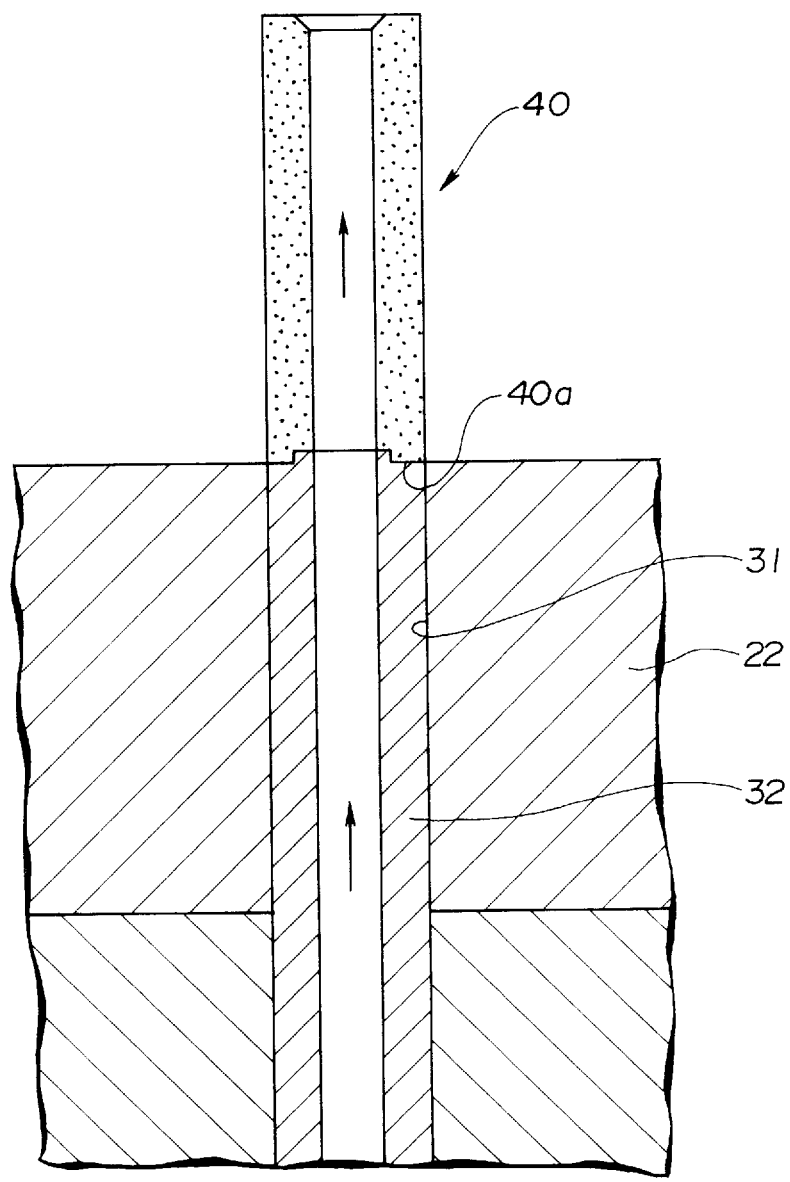
FIG. 8 is a general cross section to show the operation of the valve gate injection molding apparatus in accordance with the present invention.

Afterwards, when the protruding pin 32 is raised along the cavity 31 from the position of the protruding pin shown in FIG. 7, the protruding pin supports the rear end 40a of the tubular molded product 40 while raising the molded product 40, as shown in FIG. 8. Ultimately, the protruding pin 32 enables the removal of the molded product 40 from the cavity 31 of the lower mold 22.

Figure 9:
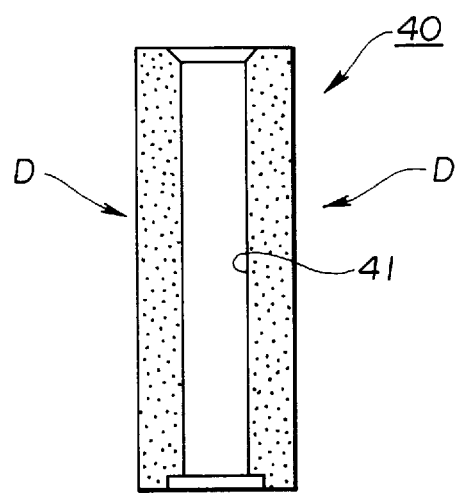
FIG. 9 is a cross section of a molded product molded with the valve gate injection molding apparatus in accordance with the present invention.

The valve gate-type injection molding apparatus 20 of the present invention forms, as shown in FIG. 9, a molded product 40 in the form of a roller and having an axial hole 41 in the center which is formed by the small diameter portion 24b of the valve pin 24.

Consequently, the valve gate-type injection molding apparatus discussed above makes possible the reduction of the number of parts thereof, because it is not necessary to install a core, being one part of the mold, inside the cavity in the mold, in order to form a hole in the center of a molded product as in conventional apparatuses. This is possible because a hole is formed in a molded product 40, formed of molten resin filling a space formed between the cavity 31 and the valve pin 24, by the small diameter portion 24b of the valve pin inserted in the cavity 31.

The molded product 40, formed with the valve gate-type injection molding apparatus discussed above, is formed as follows. After gate cut off with the large diameter portion 24a of the valve pin 24, the large diameter portion 24a extends further toward the cavity 31 and applies pressure to the molten resin B inside the cavity 31 as shown in FIGS. 5 and 6. Therefore, the occurrence of faulty sections, such as "shrink", in the thick portion D of the molded product 40, shown in FIG. 9, and molded with additional pressure, is prevented as much as possible and injection molded products with very precise dimensions are formed.

In the above embodiment, the large diameter section 24a forms the upper end of the valve pin 24 and the small diameter section 24b forms the lower end as shown in FIG. 3. The small diameter section 24b penetrates the cavity 31, so as to form the hole 41 (FIG. 9) in the center of the molded product 40. The present invention is not limited to this embodiment; it is also possible that the small diameter section 24b forms the upper end of the valve pin 24 and the large diameter section 24a the lower end, and the large diameter portion 24a penetrates the cavity 31 and forms a hole in the center of a molded product.

Figure 10:
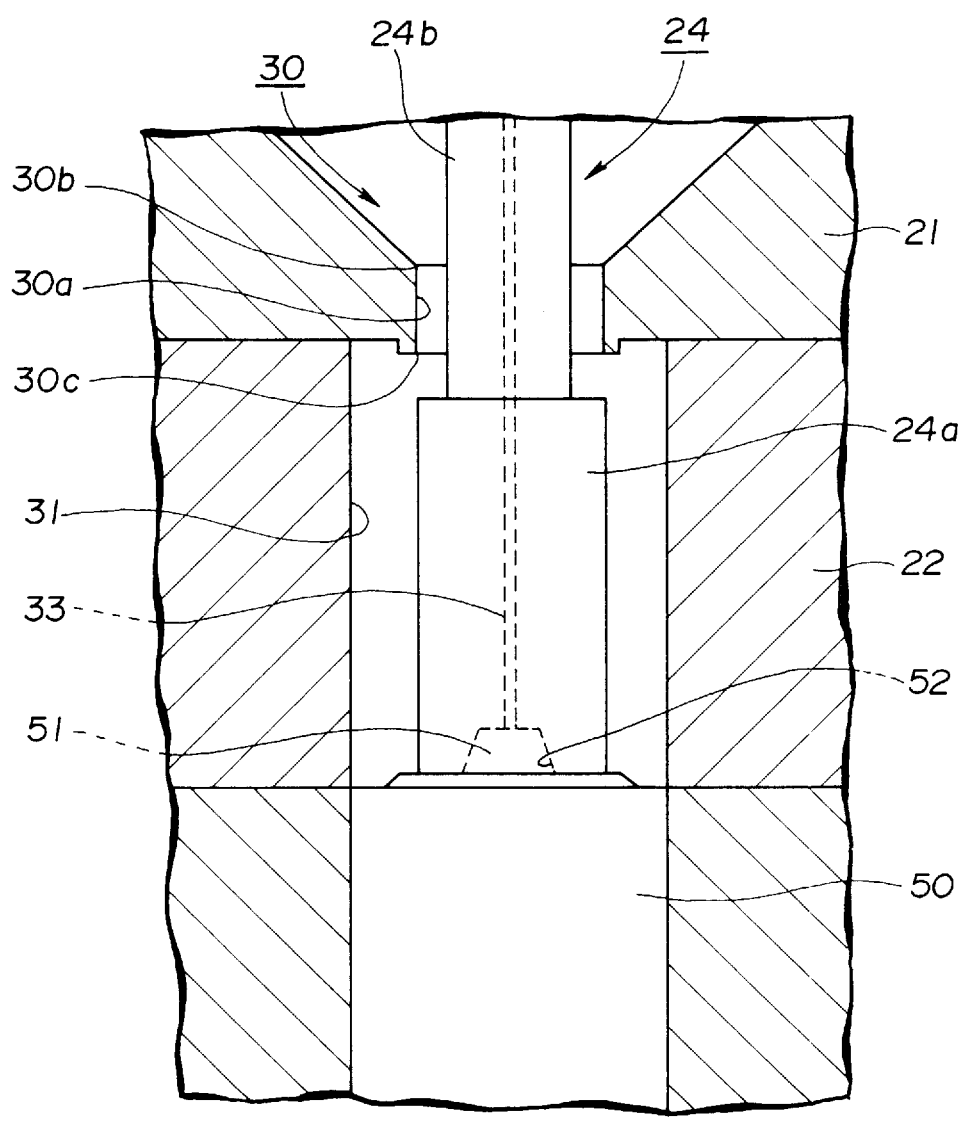
FIG. 10 is a general cross section to show another embodiment of the valve gate injection molding apparatus in accordance with the present invention.

FIG. 10 is a general cross section to show another embodiment of the valve gate injection molding apparatus in accordance with the present invention. The same portions as in FIG. 3 are shown with the same reference numerals or symbols.

In the valve gate-type injection molding apparatus 20 of this embodiment, the small diameter portion 24b forms the upper end of the valve pin 24 and the large diameter portion 24a the lower end as shown in FIG. 10. In its starting position (injection position), the large diameter portion 24a penetrates the cavity 31. The reference numeral 50 in FIG. 10 shows the protruding pin in which a protrusion 51, for determining position, is formed on the upper central portion of the protruding pin 50. The protrusion 51 is inserted inside a depression 52, formed on the center of the lower end of the valve pin 24 and determines the position of the valve pin 24 in the cavity 31.

The stopping position of the valve pin 24 places the small diameter portion 24b of the valve pin 24 at the center of the gate 30, having a larger diameter than the small diameter portion 24b. Therefore, the gate 30 is opened, specifically a ring shaped gap is formed between the inner surface of the gate 30 and the outer surface of the small diameter portion 24b of the valve pin. Molten resin can be injected from that ring shaped gap and fill the cavity 30.

Figure 11:
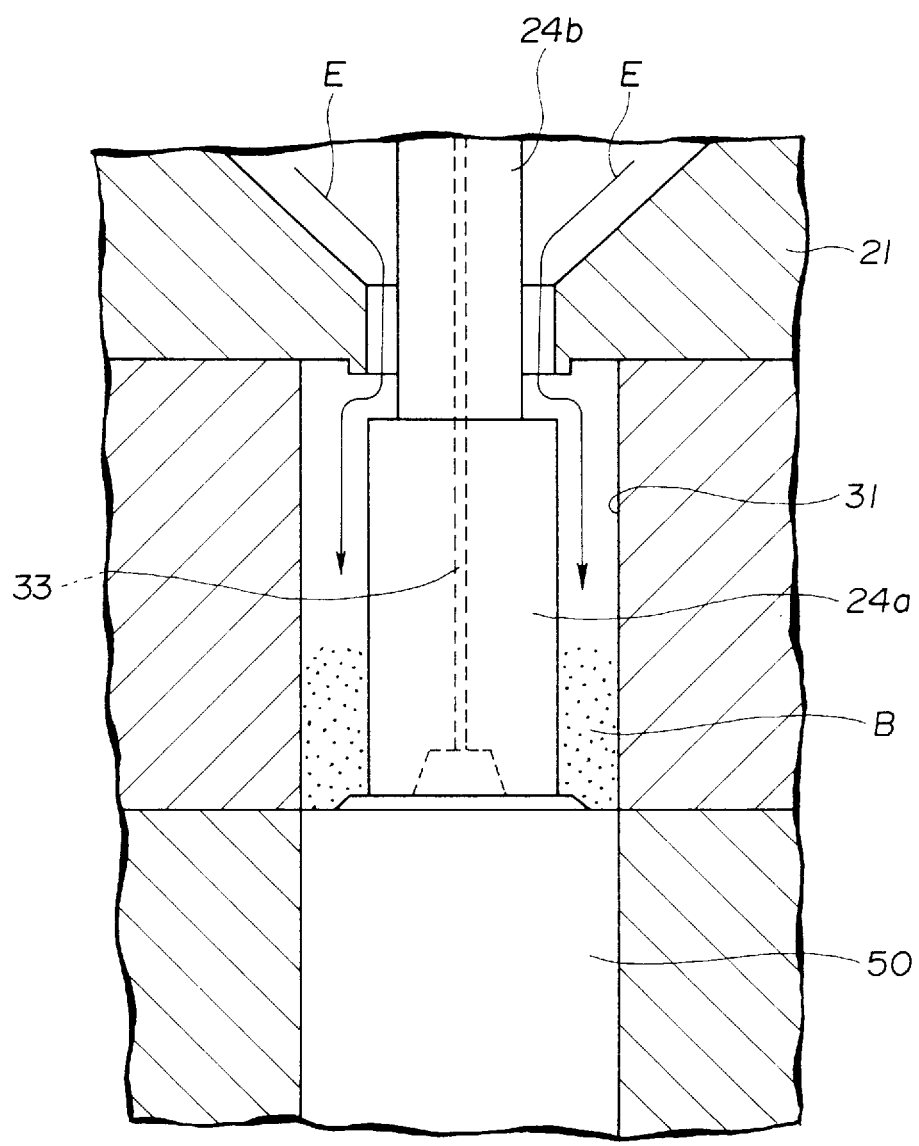
FIG. 11 is a general cross section to show the operation of another embodiment.
Figure 12:
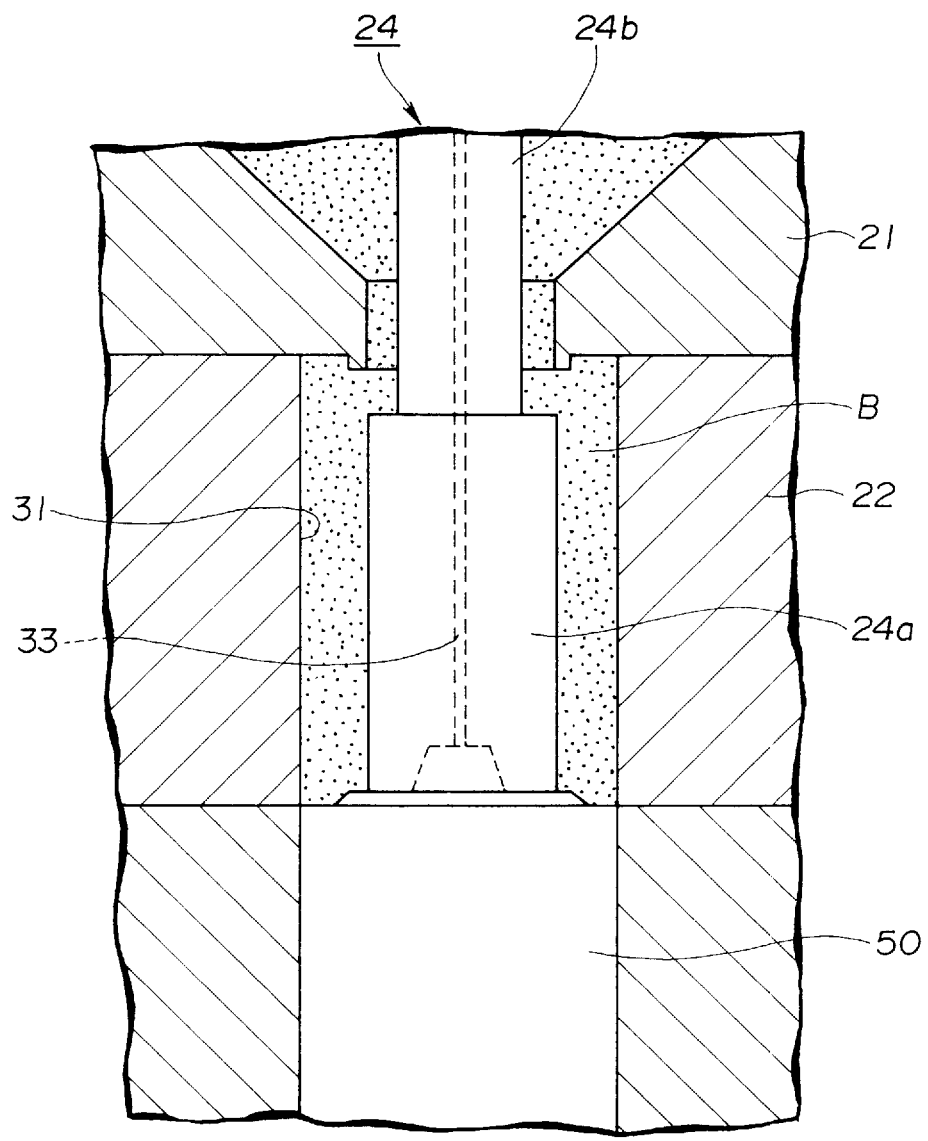
FIG. 12 is a general cross section to show the operation of another embodiment.

When molten resin is guided to the gate 30 at the stopping position of the valve pin 24 shown in FIG. 10, molten resin B is injected inside the cavity 31, by way of the gap between the gate 30 and the small diameter portion 24b of the valve pin 24, and fills in the cavity 31 as shown in FIG. 12, as shown by the arrow E in FIG. 11.

Figure 13:
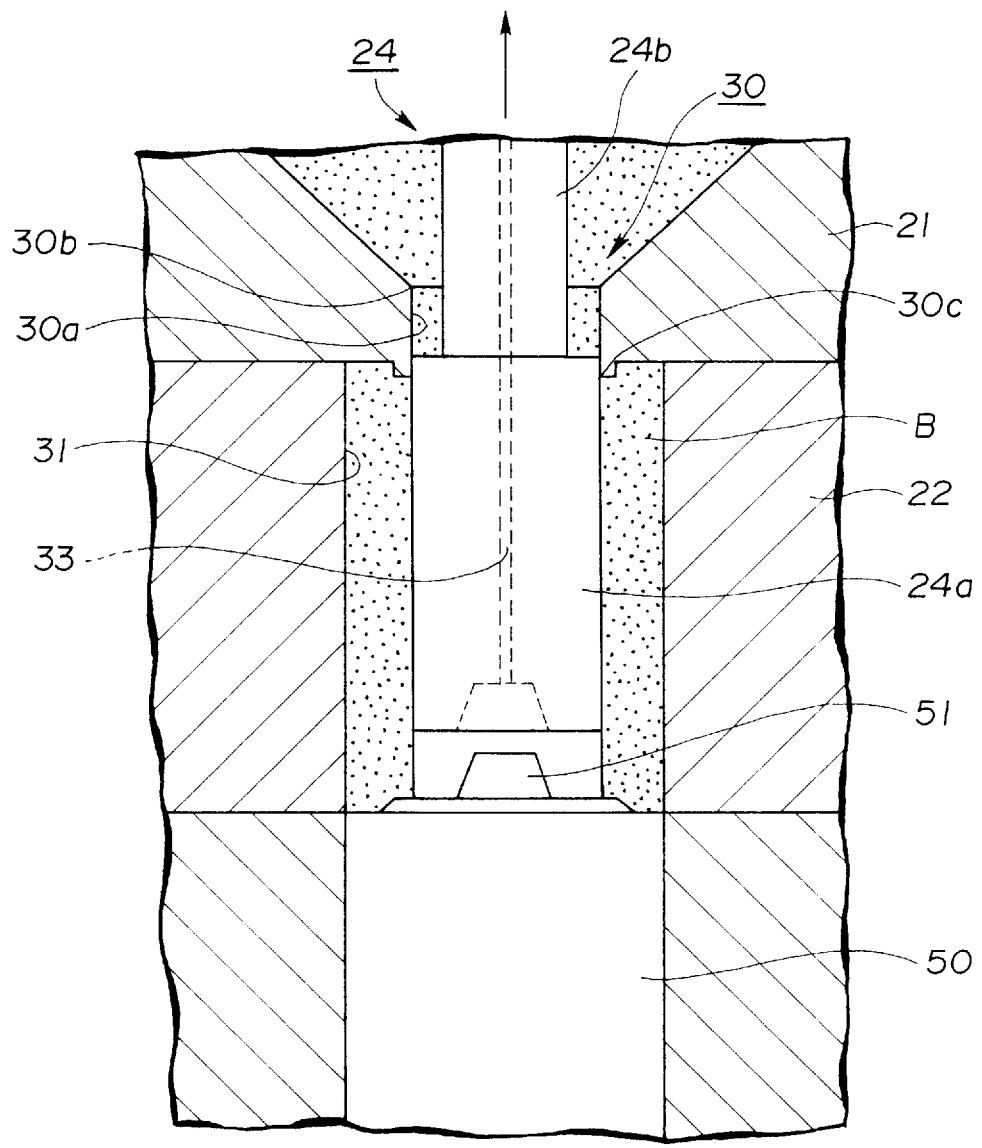
FIG. 13 is a general cross section to show the operation of another embodiment.

After molten resin B fills in the cavity 31 in this way, a cooling medium such as nitrogen gas is supplied by way of the cooling path 33 for guiding a cooling medium and formed along the central axis of the valve pin 24, cools the molten resin B, which filled in the cavity 31, and solidifies it to a certain degree. Then, when the valve pin 24 moves upwards, the upper edge of the large diameter portion 24a of the valve pin 24 reaches the position where it is inserted in the lower edge 30c of the gate 30 and interrupts the injection of molten resin into the cavity 31 (gate cut), as shown in FIG. 13, where the same portions as in FIG. 12 are shown with the same reference numerals or symbols.

Figure 14:
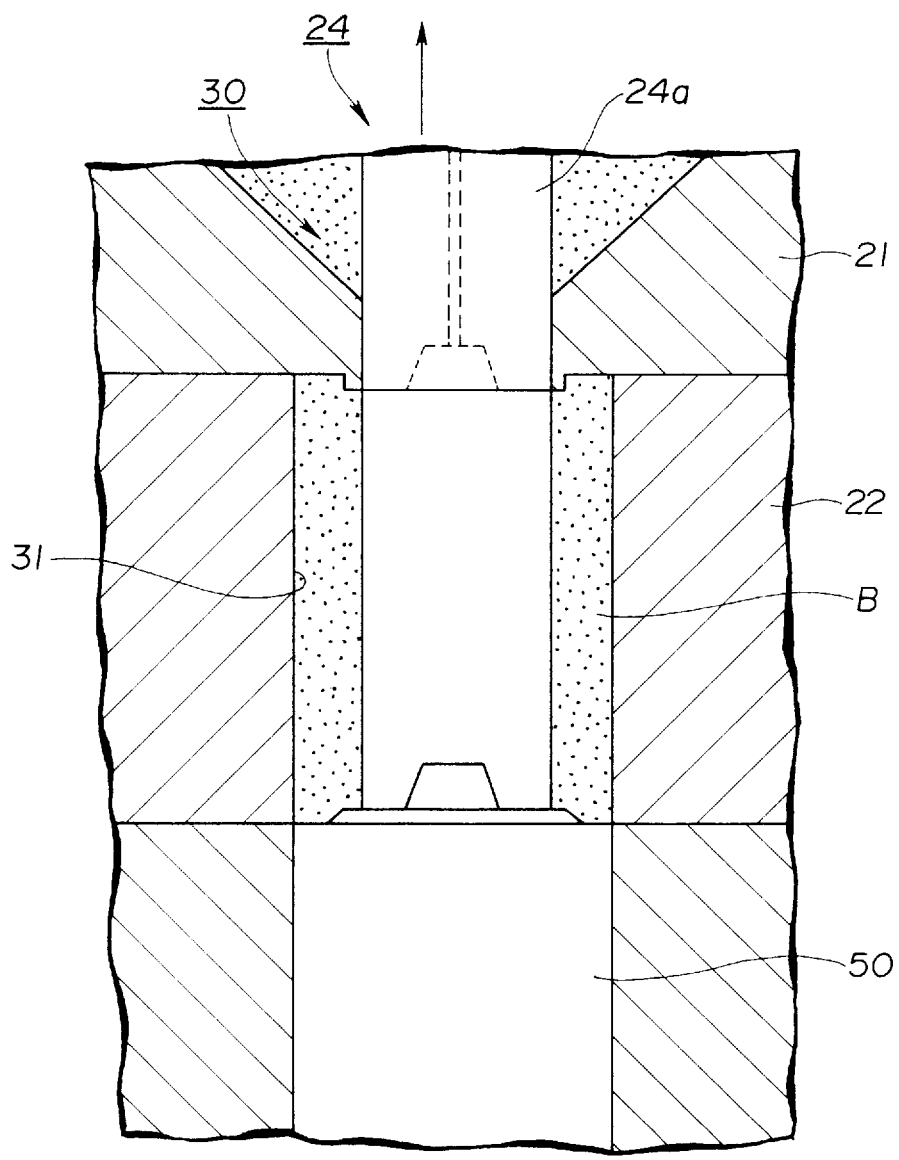
FIG. 14 is a general cross section to show the operation of another embodiment.

Furthermore, after the large diameter portion 24a of the valve pin 24 is completely withdrawn from the cavity 31 as shown in FIG. 14, the upper mold 21 and lower mold 22 shown in FIG. 6 are vertically separated and the mold is opened. Whereupon a tubular molded product 60, comprising solidified molten resin B and corresponding to the form of the cavity 31, remains inside the cavity 31 of the lower mold 22 as shown in FIG. 15.

Figure 15:
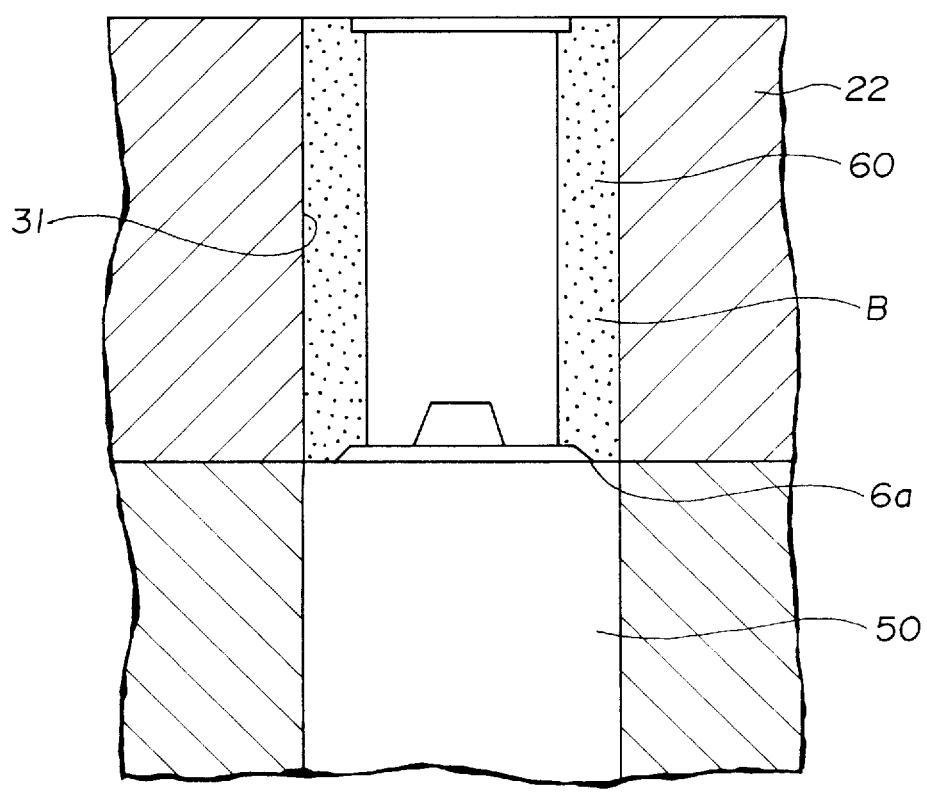
FIG. 15 is a general cross section to show the operation of another embodiment.
Figure 16:
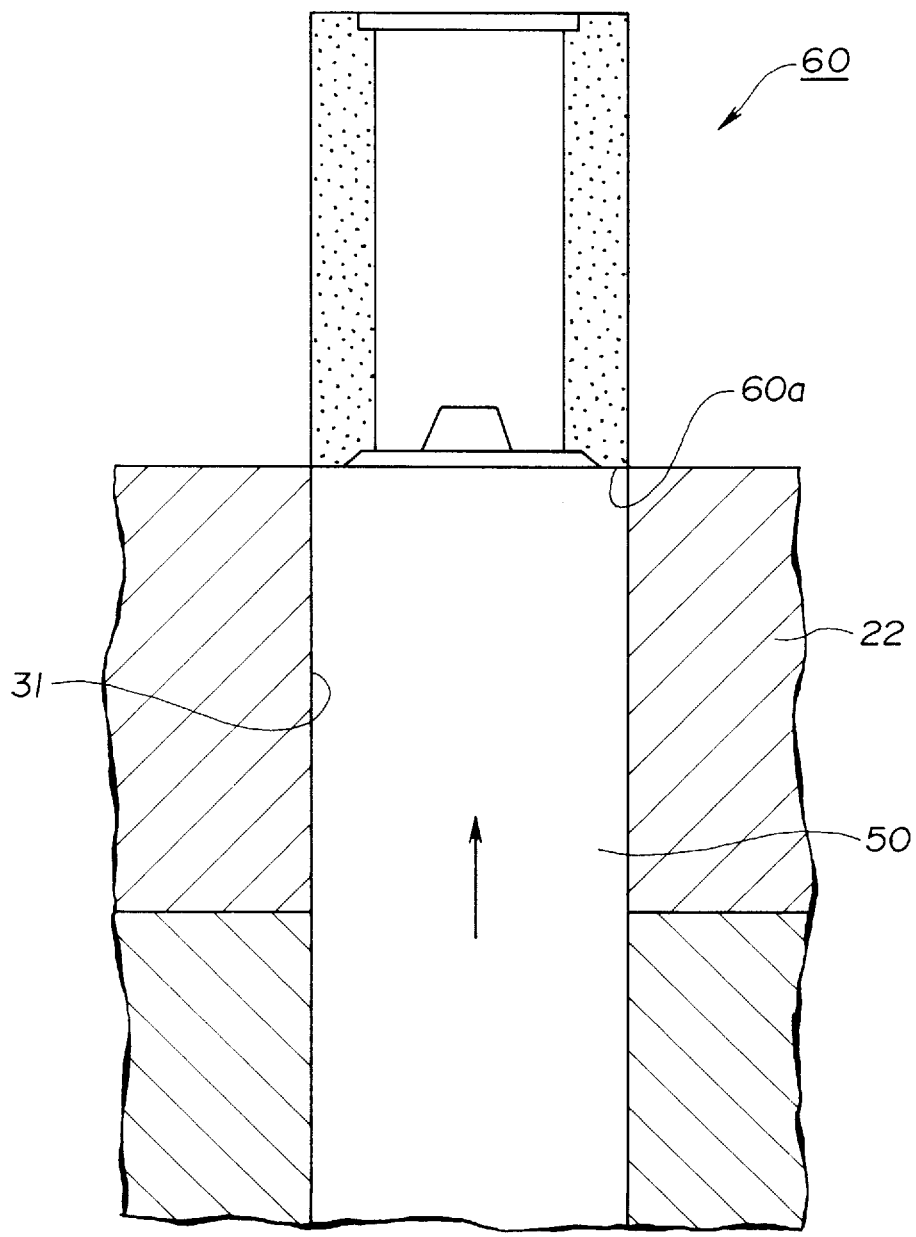
FIG. 16 is a general cross section to show the operation of another embodiment.
Figure 17:
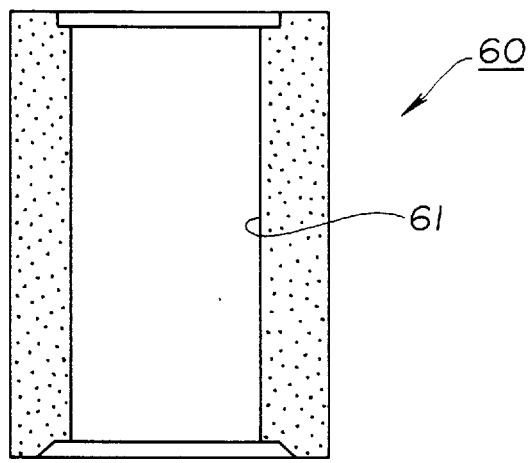
FIG. 17 is a cross section of a molded product molded with another embodiment.
Figure 18:
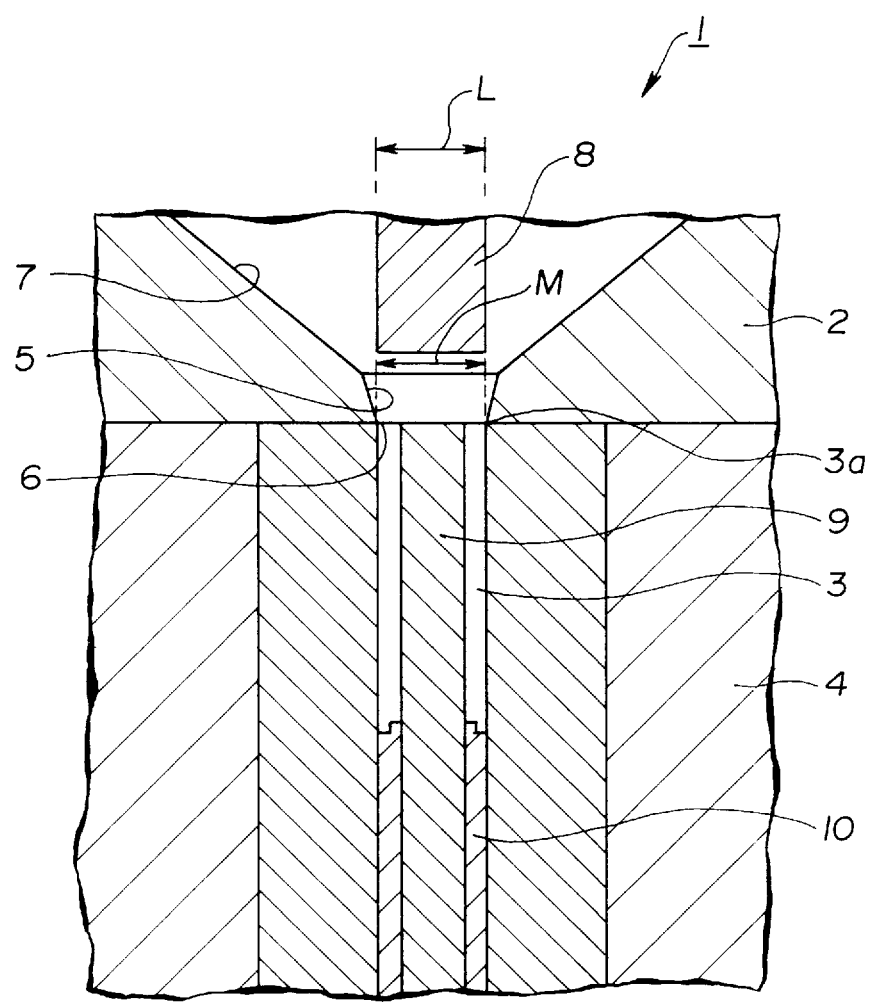
FIG. 18 is a cross section of the principal elements of a conventional valve gate-type injection molding apparatus, to execute a conventional valve gate-type injection molding operation.
Figure 19:
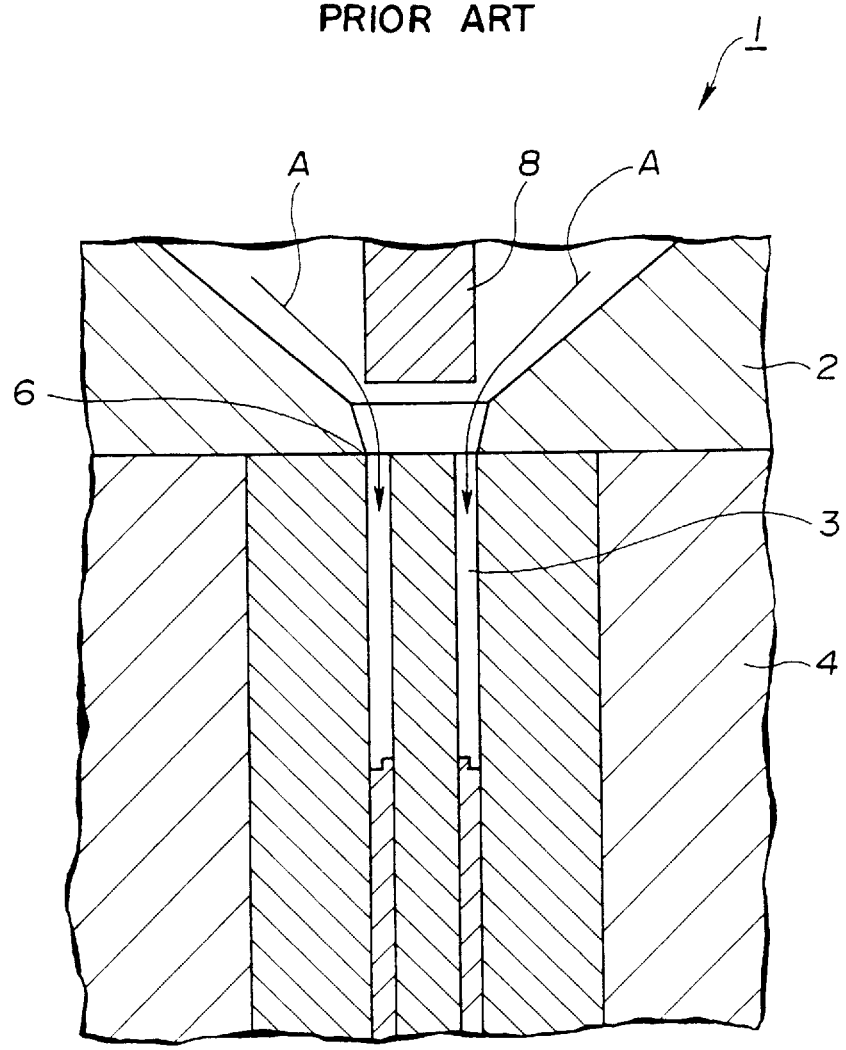
FIG. 19 is a general cross section of the principal elements to show the operation of the conventional valve gate injection molding apparatus.
Figure 20:
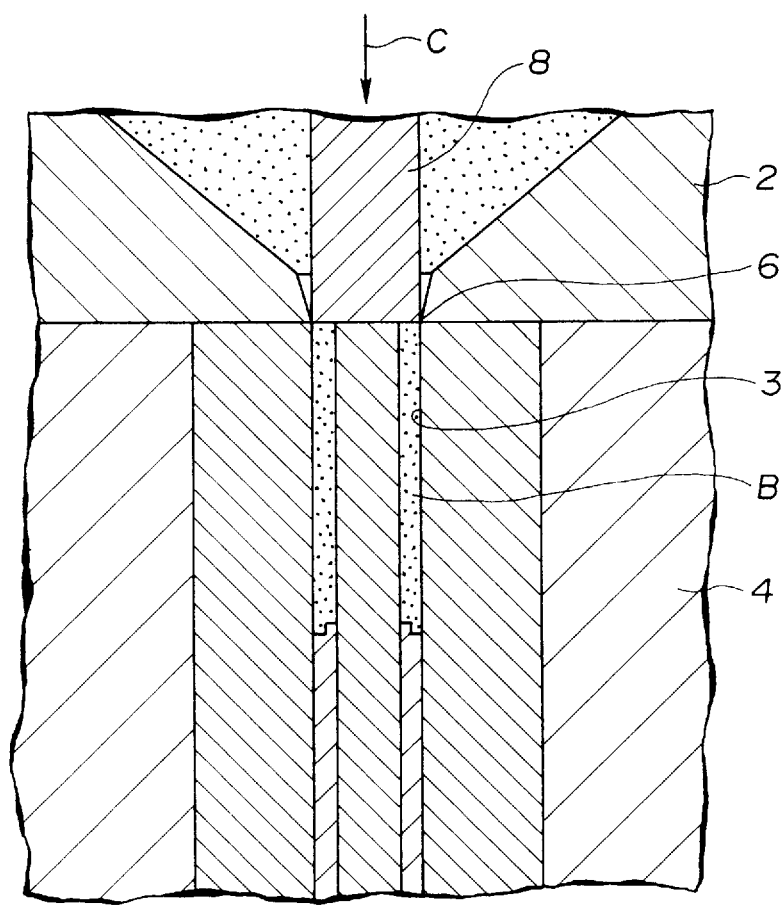
FIG. 20 is a general cross section of the principal elements to show the operation of the conventional valve gate injection molding apparatus.
Figure 21:
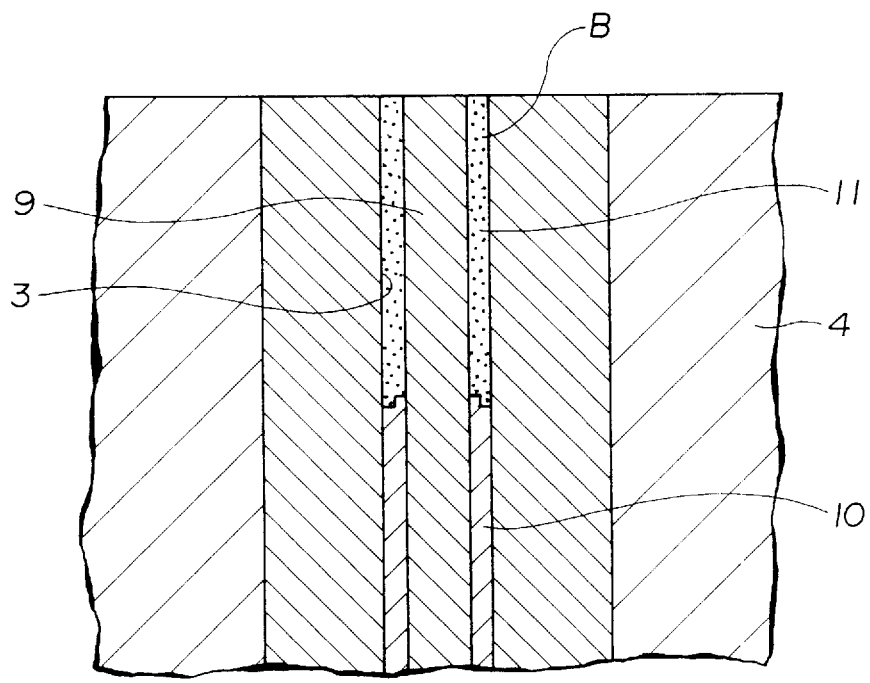
FIG. 21 is a general cross section of the principal elements to show the operation of the conventional valve gate injection molding apparatus.
Figure 22:
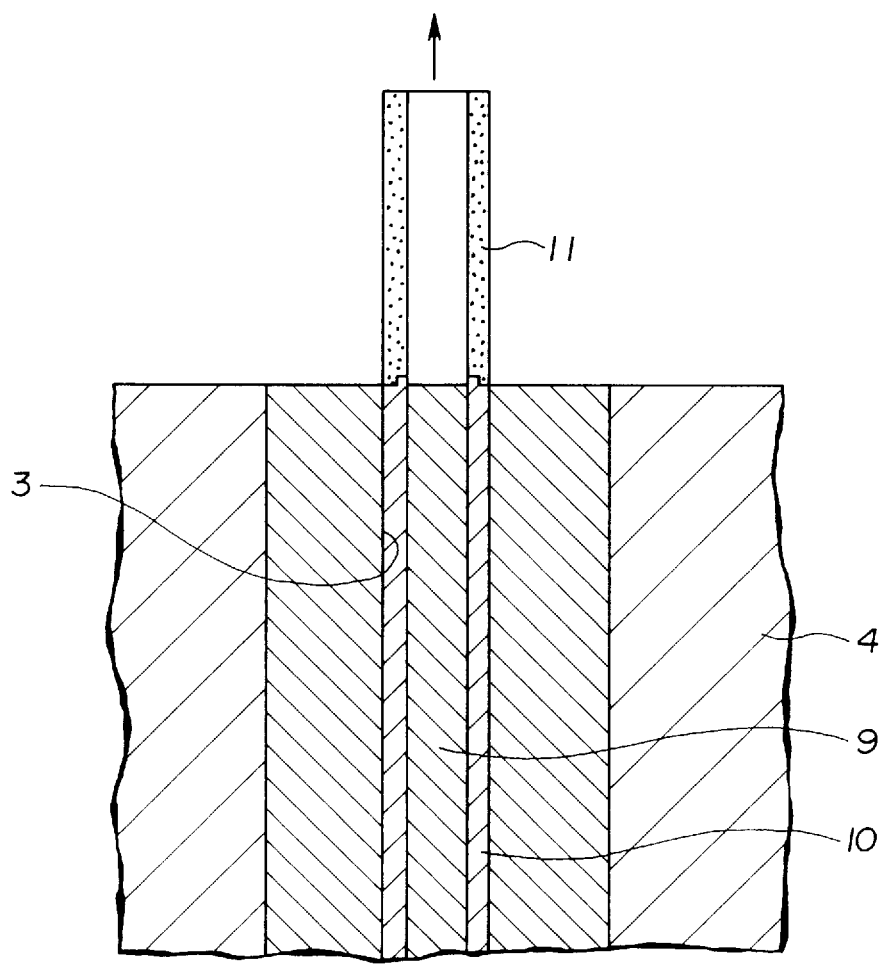
FIG. 22 is a general cross section of the principal elements to show the operation of the conventional valve gate injection molding apparatus.
Figure 23:
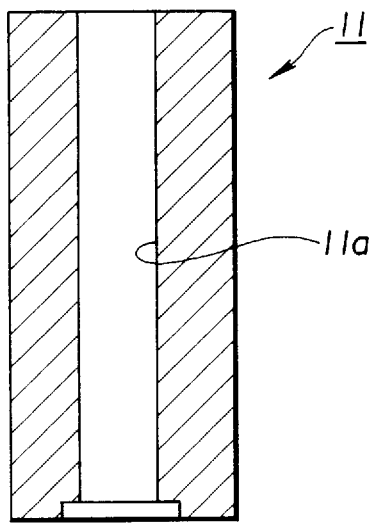
FIG. 23 is a cross section of a molded product molded with the conventional valve gate injection molding apparatus.
Figure 24:
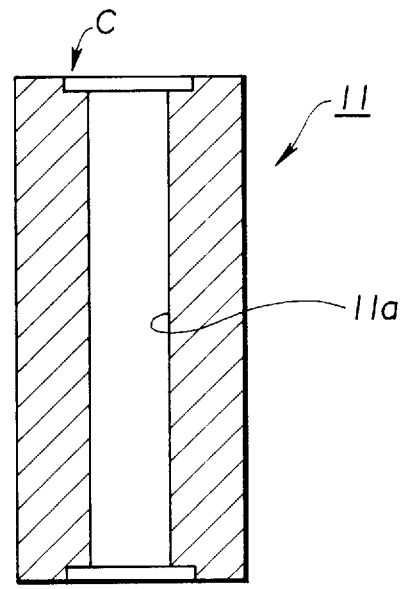
FIG. 24 is a cross section of a molded product molded with the conventional valve gate injection molding apparatus.
Figure 25:
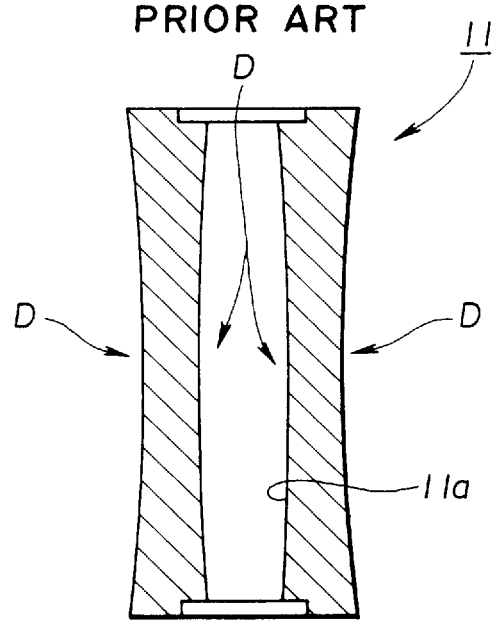
FIG. 25 is a drawing to show the state where a "shrink" is caused in the molded product molded with the conventional valve gate injection molding apparatus.

Afterwards, when the protruding pin 50 is raised along the cavity 31 from the position of the protruding pin 50 shown in FIG. 15, the protruding pin 50 supports the rear end 60a of the tubular molded product 60 while raising the molded product 60, as shown in FIG. 16. Ultimately, the protruding pin 50 enables the removal of the molded product 60 from the cavity 31 of the lower mold 22.

The valve gate-type injection molding apparatus 20 of the present invention forms, as shown in FIG. 9, a molded product 60 in the form of a roller and having an axial hole 61 in the center, which is formed by the large diameter portion 24a of the valve pin 24.

Consequently, even the other embodiments of the valve gate-type injection molding apparatus discussed above makes possible the reduction of the number of parts thereof, because it is not necessary to install a core, being one part of the mold, inside the cavity in the mold, in order to form a hole in the center of a molded product as before. This is possible because a hole is formed in a molded product 60, formed of molten resin filling a space formed between the cavity 31 and the valve pin 24, by the large diameter portion 24a of the valve pin inserted in the cavity 31.

Moreover, rollers 40 and 60, having axial holes formed in the centers, were used as examples of the molded products molded with the valve gate-type injection molding method and apparatus of the present invention. Of course, the molded products, molded with the valve gate-type injection molding method and apparatus of the present invention, are not limited to rollers 40 and 60 and may appropriately be any injection molded product having a hole in the center, such as a molded product formed of synthetic resin, for example, compact discs CD, gears, floppy disk cases, and cassette reels for audio cassettes, etc.

Industrial Applicability

A valve gate-type injection molding method and apparatus, in accordance with the present invention as discussed above, is appropriate for the manufacture of molded products, formed with synthetic resin and which require precise molding.

I claim:

1. A method for valve gate injection molding wherein molten resin is injected from a valve in which the molten resin under prepressure is held, by way of a gate into a cavity formed in a mold, and the molten resin injected inside the cavity is cooled and solidified to attain a molded product of synthetic resin, characterized in that the method comprises at least the steps of:

constituting a valve pin, which is installed within the valve and controls the amount of molten resin injected from the valve, having a large diameter portion for opening and closing the gate, a small diameter portion to be inserted into the cavity and a middle diameter portion to be inserted into the cavity, the middle diameter portion having a shape of truncated cone, a bottom of the middle diameter portion connected to the small diameter portion and having a diameter same as that of the small diameter portion, a top of the middle diameter portion connected to the large diameter portion and having a diameter smaller than that of the large diameter portion and larger than that of the smaller diameter portion;

inserting the small diameter portion of the valve pin inside the cavity;

injecting and filling molten resin by way of the gate into a space formed between the small diameter portion and the middle diameter portion of the valve pin and the cavity; and extending the large diameter portion further into the cavity after the gate is cut off with the large diameter portion of the valve pin, so as to insert the middle diameter portion into the cavity and add pressure to the molten resin injected into and filled in the space formed between the small diameter portion and the middle diameter portion of the valve pin and the cavity.

2. A valve gate injection molding apparatus wherein molten resin is injected form a valve in which the molten resin under prepressure is held, by way of a gate into a cavity formed in a mold, and the molten resin injected inside the cavity is cooled and solidified to attain a molded product of synthetic resin, characterized in that:

a valve pin, which is installed within the valve and controls the amount of molten resin injected from the valve, is constituted of a large diameter portion for opening and closing the gate, a small diameter portion extended so as to be inserted in the cavity and a middle diameter portion to be inserted into the cavity, the middle diameter portion having a shape of truncated cone, a bottom of the middle diameter portion connected to the small diameter portion and having a diameter same as that of the small diameter portion, a top of the middle diameter portion connected to the large diameter portion and having a diameter smaller than that of the large diameter portion and larger than that of the smaller diameter portion, and after the small diameter portion of the valve pin is inserted inside the cavity, the molten resin is injected into and filled within, by way of the gate, a space formed between the small diameter portion and the middle diameter portion of the valve pin and the cavity, while after the gate is cut off by the large diameter portion of the valve pin, the large diameter portion is extended further into the cavity so as to insert the middle diameter portion inside the cavity and apply pressure to the molten resin injected into and filled in the space between the small diameter portion and the middle portion of the valve pin and the cavity.

* * * * *